United States Patent Office 3,325,395
Patented June 13, 1967

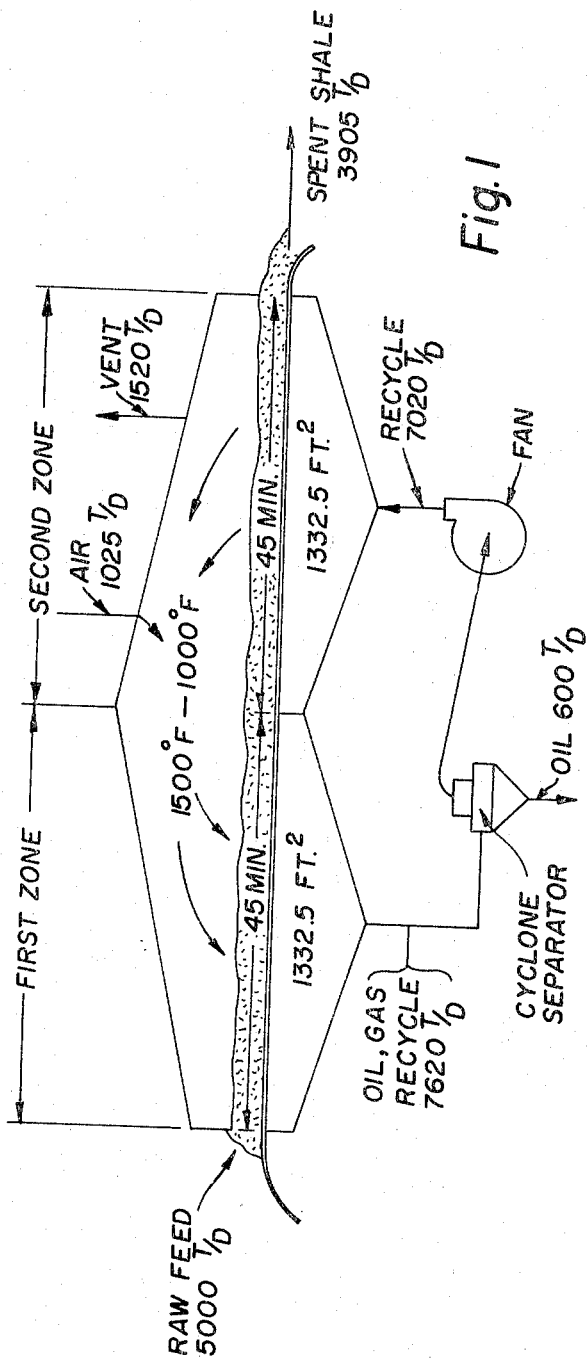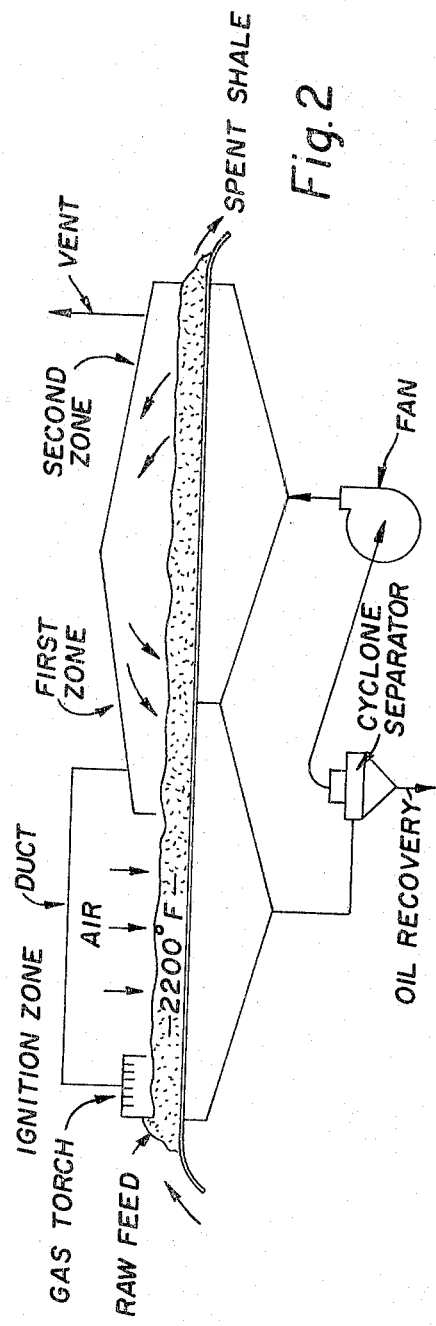

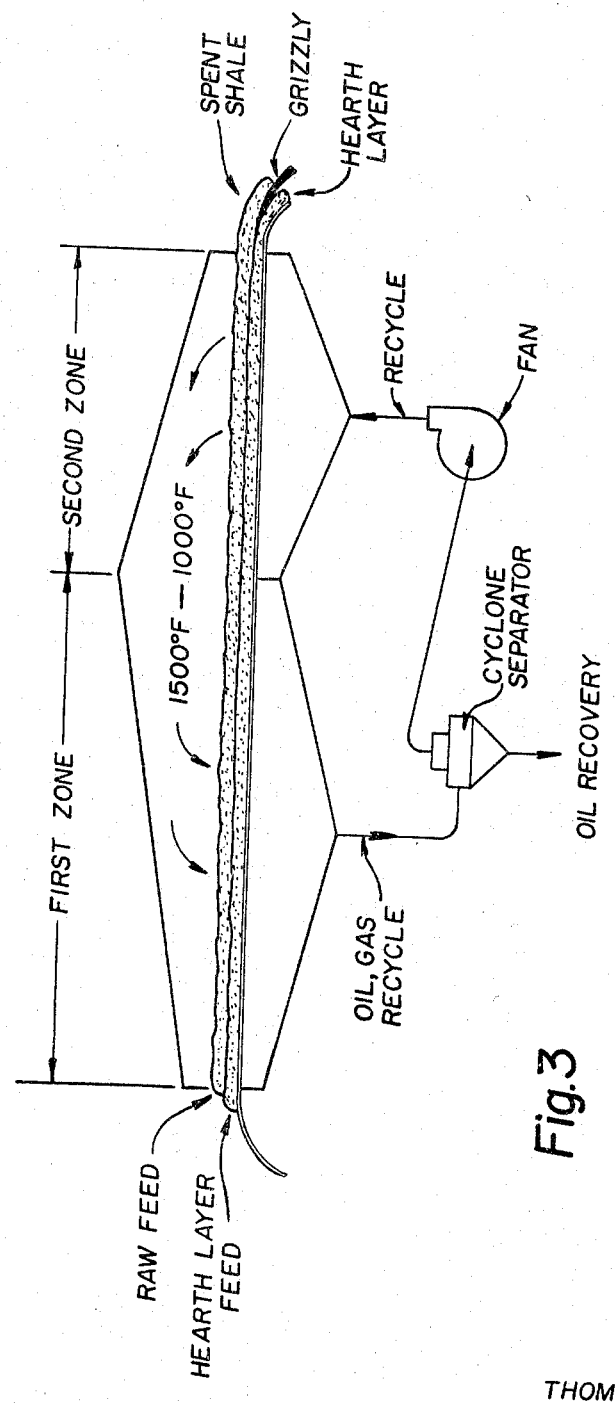

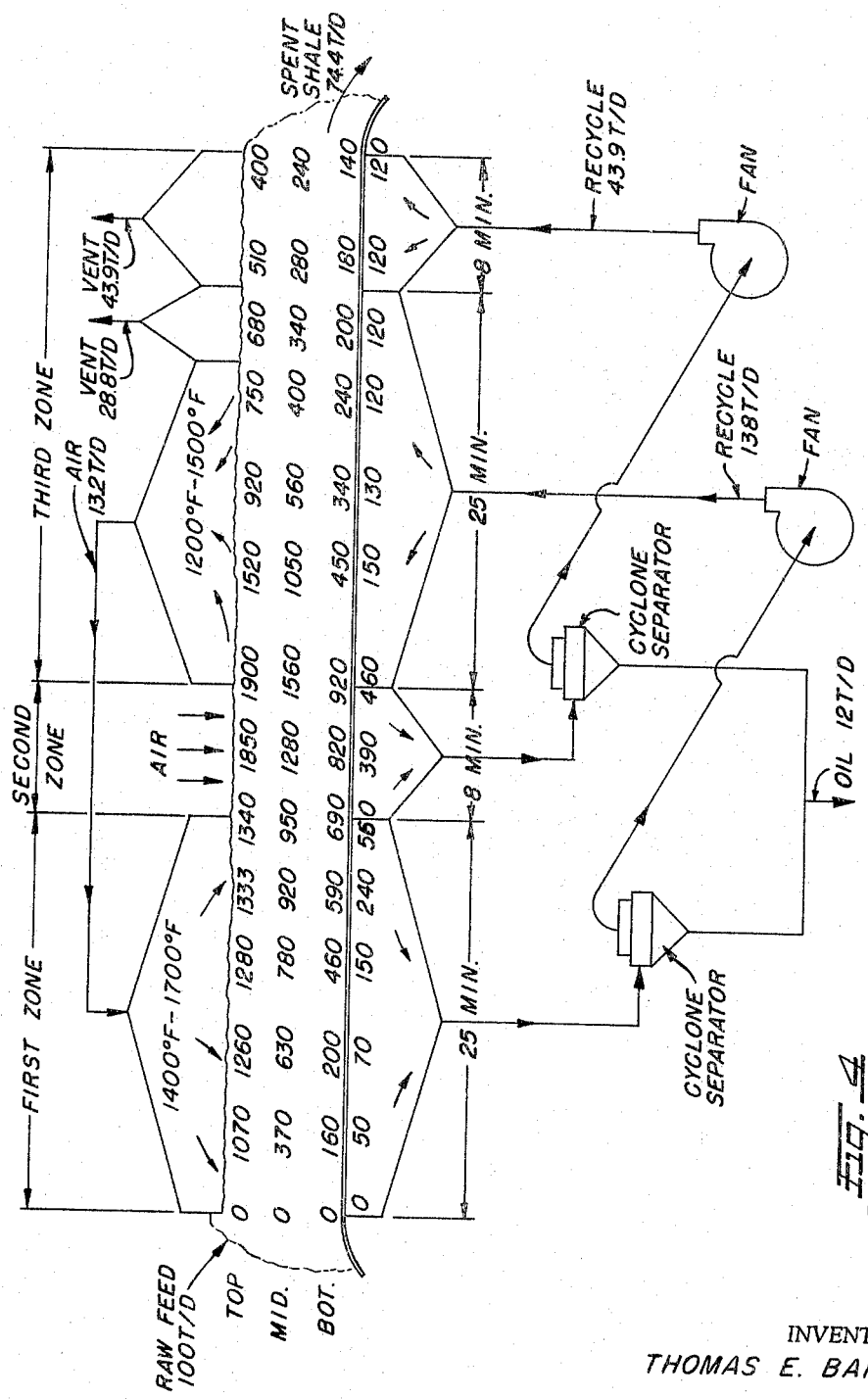

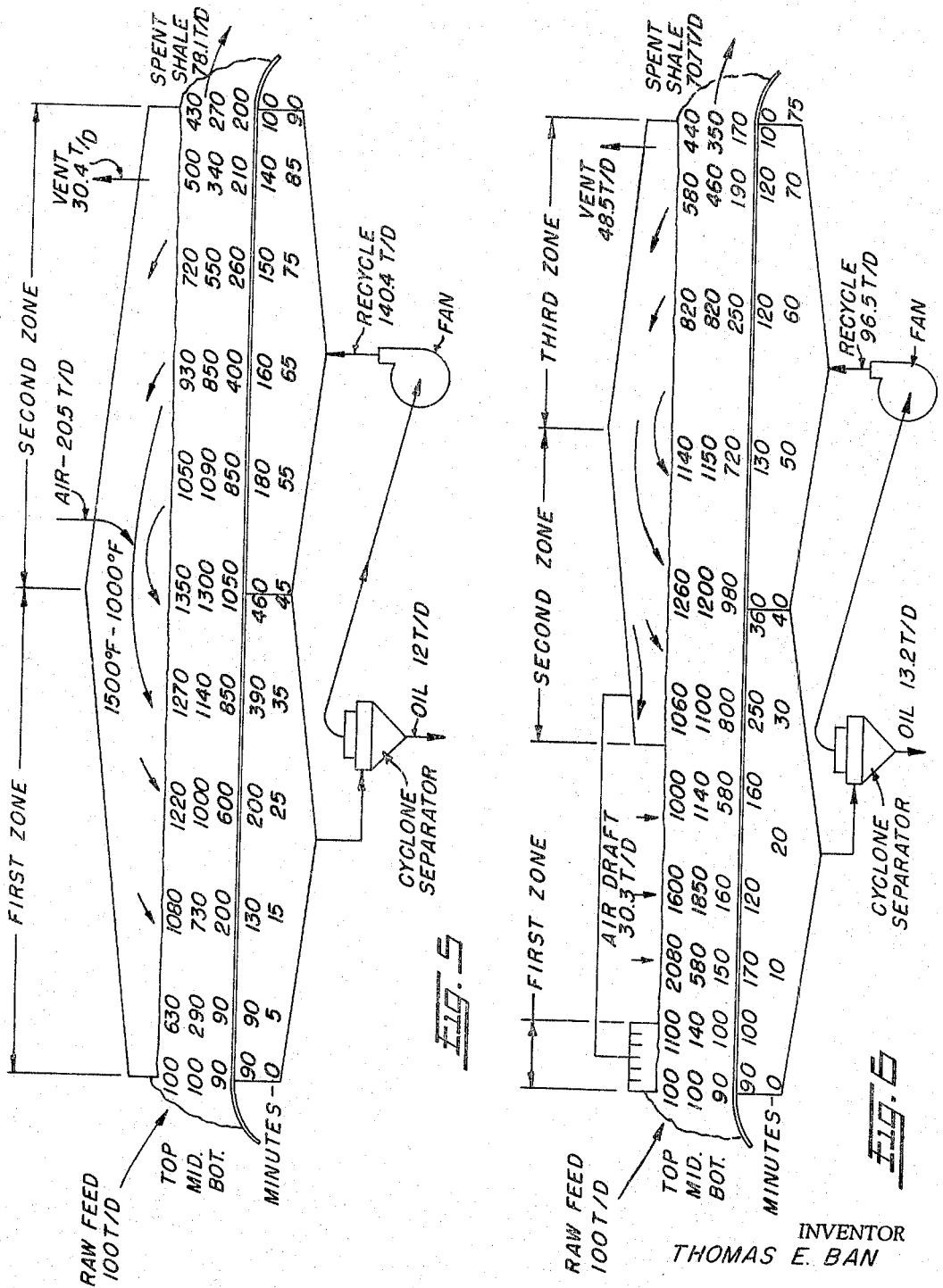

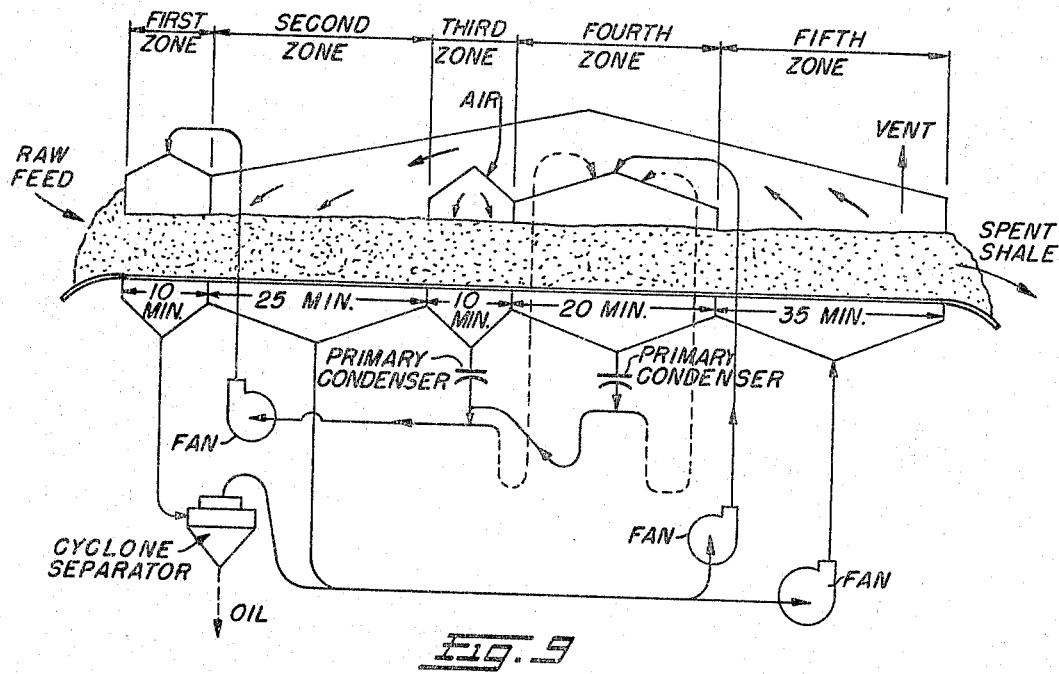
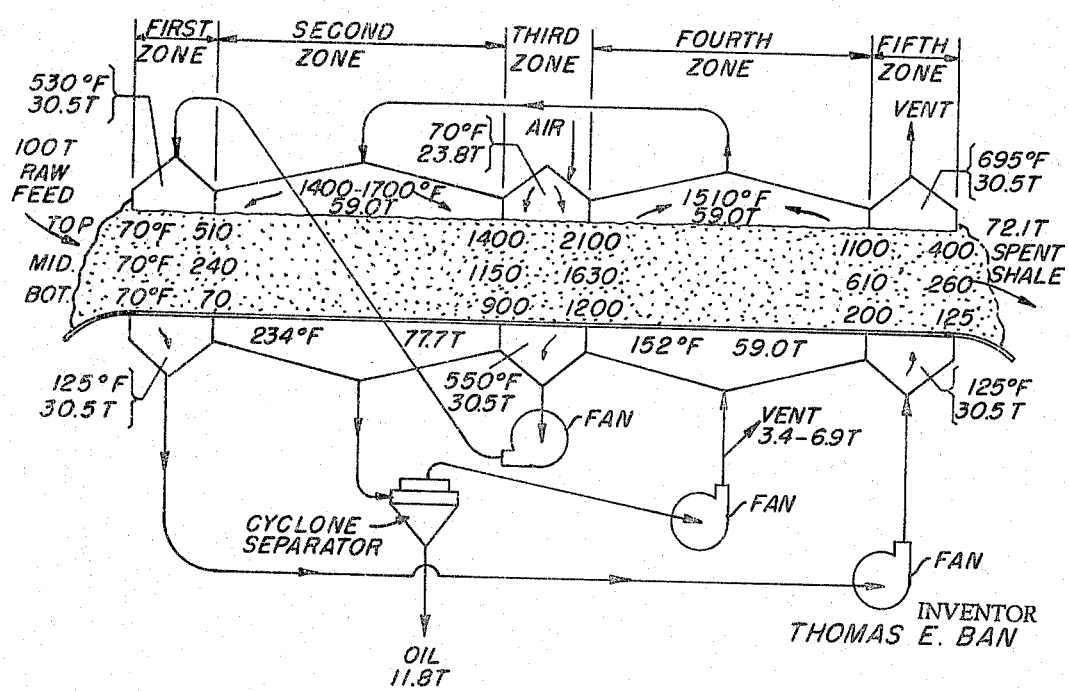

3,325,395
TRAVELLING GRATE METHOD FOR THE RECOVERY OF OIL FROM OIL BEARING MINERALS
Thomas E. Ban, Cleveland Heights, Ohio, assignor to McDowell-Wellman Engineering Company, a corporation of Ohio
Filed Apr. 19, 1965, Ser. No. 449,022
37 Claims. (Cl. 208—9)

This application is a continuation-in-part of my copending application filed Oct. 1, 1964, having Ser. No. 400,953, now abandoned.

This invention relates, as indicated, to a process for recovering oil from oil bearing minerals, particularly shale, lignites, tar sands, coal, and other mineral oil bearing materials.

Extremely large deposits of oil bearing shale are known to exist in the United States and particularly in Colorado and Wyoming. Estimates of the recoverable oil in the Piceance Basin reach up to one trillion barrels. Shale rock and certain oil sands contain a substance called "kerogen" or "petrogen" which is an organic waxy compound. When heated to a temperature of about 800° F. it cracks partially to yield a substance which has properties resembling crude oil.

It has been known for some time that the oil or organic constituents of the shale rock can be recovered and utilized for the manifold purposes for which crude oil in the liquid state is normally used.

The United States Bureau of Mines has conducted considerable experimental work on the recovery of shale oil from these Western deposits. Its studies have resulted in the shaft furnace method of recovery of the oil whereby a quantity of oil bearing rock is deposited in a vertical furnace and submitted to an updraft of heated gases. Another independent investigation utilizing a retort method of recovery which is similarly inhibited, utilizes a downdraft procedure followed by recovery of the kerogen components from the gases.

The capacity of the previous processes are relatively quite limited and enable the handling of about 1,000 tons per day of oil bearing shale rock.

The present invention provides a process by which the capacity of the equipment for handling oil bearing materials, e.g. rock or sand, may be greatly increased, in some cases by a factor of 5, and which is far more economical to operate. In this process the heat is transferred directly to the oil bearing material by passing gases through a bed of the material supported on a traveling grate. There are no auxiliary heat transfer elements which need to be preheated and admixed with the rock as in certain of the prior art processes.

Briefly stated, run of the mine, oil bearing material is first obtained or crushed to a workable particle size not exceeding 18" in diameter. This material is then charged to a traveling grate to form a bed or burden thereon. The traveling grate with its burden passes into a first zone where the burden is exposed to heat reducing or neutral gases at a temperature of from 1000° F. to 1500° F., by passing the gases through the burden in either updraft or downdraft fashion. This elevates the temperature of the burden to an oil educting temperature of about 800° F., at which point the kerogen breaks down or cracks into an oil vapor which becomes condensed and suspended in the gas stream passing through the bed. This draft or gas is then conducted through a cyclone separator where the oil is separated from the gas. Any suitable means for separating the oil from the gases may be used.

The traveling grate moves to a second zone where the oil depleted gases are recirculated through the spent burden to aid in cooling the burden, and to preheat the gases to oil educting temperature for recycling through a new burden in the first zone. Air may be added to the gas stream as to burn part of the burnable constituents contained in the gas stream, and to elevate the temperature of the gas to from 1000° F. to 1500° F. The spent burden is removed from the traveling grate. The above mentioned basic process and embodiments thereof, will hereinafter be more fully explained, utilizing oil-bearing shale as the illustrative example, it being understood that other oil-bearing minerals, e.g. sand, coal, lignite, organic materials, e.g. cellulose materials may also be used.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

In the annexed drawings:

FIG. 1 is a diagrammatic illustration of a traveling grate apparatus outfitted for performing the basic process;

FIG. 2 is a diagrammatic illustration of an apparatus outfitted for performing the modification in which burning of a portion of the fixed carbon in the burden is employed;

FIG. 3 is a diagrammatic illustration of a conventional traveling grate apparatus with the modification employing a hearth layer of catalytic cracking material and means for stripping the other burden from the hearth layer;

FIG. 4 is a diagrammatic illustration of an apparatus outfitted for performing the modification in which the burden is exposed to ambient air intermediate the first and second zones, and includes a table of exemplary bed temperatures in degrees Fahrenheit, recorded while performing such process;

FIG. 5 is a diagrammatic illustration of a traveling grate apparatus outfitted for performing the basic process, and includes a table of exemplary bed temperatures in degrees Fahrenheit recorded while performing such process;

FIG. 6 is a diagrammatic illustration similar to FIG. 2, which includes a table of exemplary bed temperatures in degrees Fahrenheit, recorded while performing such process;

FIG. 9 is a diagrammatic illustration of a modification of the apparatus of FIG. 8; and FIG. 10 is a diagrammatic illustration of an apparatus outfitted for performing another modification in which the amount of vent gas is greatly reduced, and includes a table of exemplary bed temperatures in degrees Fahrenheit, recorded while performing such process.

Figure 7:
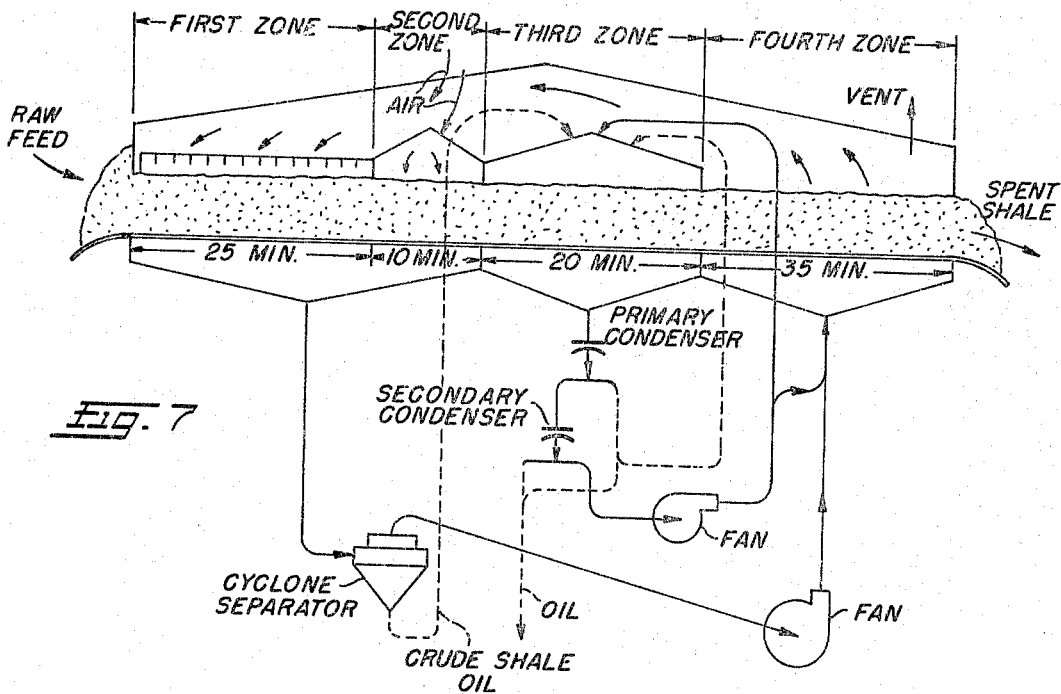
FIG. 7 is a diagrammatic illustration of an apparatus outfitted for performing the modification in which the separated oil is returned for thermal treatment to reduce viscosity.

FIGS. 1 and 5 are illustrations of a traveling grate apparatus outfitted for performing the basic process and particularly suitable for use with oil bearing shales. Run of the mine, oil-bearing shale rock is first crushed in accordance with the present process so that the particle size ranges between —¼" and about 18" in diameter, and preferably between about ¼" and about 6" in diameter. The charge material containing particles of this relatively broad range of sizes is deposited on a traveling grate in such a manner that the large particles, i.e. the 6" particles, are in the upper region of the bed and the smaller particles are disposed toward the bottom portion of the bed adjacent the supporting grates. To produce the condition diagrammatically shown in FIGS. 1 and 5, a graded blend of crushed shale was stratified upon the traveling grate as a 48″ layer. The size analysis of the shale from top to bottom, respectively, was as follows:

| | | Inches |
|---|---|---|
| 35% representing 17″ | | 6″ by 3″ |
| 18% representing 8½″ | | 3″ by 2″ |
| 27% representing 13″ | | 2″ by 1″ |
| 20% representing 9½″ | | 1″ by ¼″ |

The layered charge is desirably segregated in order to have the large specimens near the top of the bed where they will be subjected to longest periods of high temperature heat. Heat residency at the bottom of the bed for this system is relatively short, hence smaller specimens are preferentially oriented adjacent the grate surface. The spacing of the grate bars forming the bottom of the pallets on the traveling grate machine is, of course, sufficient to prevent sifting of ¼″ particles through it. The depth of the bed may vary anywhere from a few inhces to 8′ or more, and the width of the pallets from 24″ to as much as 8′ or 10′.

The pallets proceed successively through a plurality of zones. In the first zone, or distilling zone, the layered burden on the pallets is exposed to hot reducing or neutral gases at a temperature broadly in the range of 1000° F. to 1500° F. and desirably from about 1200° F. to about 1400° F. by passing gases through the bed in either updraft or downdraft direction. In this particular embodiment of the invention, however, the hot gases are passed downwardly through the burden or bed to elevate its temperature to an oil educting temperature of about 800° F. The temperature of the bed usually follows a gradient which varies with the stage or zone and the nature (i.e. cooling or heating) and direction of the gas flow, and unless otherwise specified, average bed temperatures are referred to herein. The hot gases cause thermal removal of the oil from the shale and conversion into three fractions: carbonaceous oil, volatile oil fractions, and combustible gases. The volatile and gasified fractions are conducted as a mist or "oil fog" through the underlying layers of charge material and through the relatively cooler metal members of the traveling grate. The "oil fog" is then conducted through a suitable separator, e.g. a cyclone separator, where the gases are simultaneously cooled and spun about an axis in such a manner to centrifugally deposit the suspended and condensed particles of oil on the cool surface of the separator to produce separately oil and oil-depleted gases. Any suitable oil recovery means may be used.

As shown in FIGS. 4, 5, 6 and 10, oil eduction temperatures, in excess of about 800° F., are reached in the portion of the burden initially contacted by the recycled gases and/or the hot gases, e.g. the upper portion, when the draft is downwardly directed. The bed temperatures in the embodiments shown decrease vertically to temperatures adjacent the grates, which are below the vaporization point of the bulk of the oil, for the major part of the horizontal path; and well below the vaporization point of the bulk of the oil just below the grates. Accordingly, as indicated, the oil is condensed to the liquid phase in the cooler portions of the burden to yield an "oil fog" or mist of suspended oil droplets internally of the bed and grates. These droplets are separated from the gas medium in the separatory equipment externally of the eduction apparatus, e.g. the cyclone separator.

The traveling grates then move into a second zone or cooling zone where the oil-depleted gases are then recirculated up through the oil-depleted shale comprising the terminal part of the bed to aid in cooling the bed and to preheat the gases again for recirculation through the forepart of the bed. The gases also help to cool the metal grates which, as previously indicated, act as a continuous condenser to help condensation of the vapors which are recovered in the separator means.

A considerable portion of the sensible heat is transmitted in high temperature gases exiting from the topmost layers within the cooling zone of the traveling grate. This heat can be utilized to advantage by charging fresh solids directly on top of the spent shale within the cooling zone and thus contribute further to the unit capacity of the system. For example, approximately, a 6″ depth layer of minus 4″ particles charged upon a 4′ bed contributes an additional capacity of about 12% to 15%.

Any oxygen containing gas, e.g. air, may be added to the gas stream exiting from above the burden in the terminal zone so as to burn part of the uncondensed burnable hydrocarbons contained in the gas stream and to elevate the temperature of the gas to from about 1200° F. to about 1400° F. The term air as used hereinafter means any oxygen containing gas. Air is illustrated as entering the mid-section of the hood, though it may be more strategically located. For example, the air may be introduced through a venturi type tube adjacent the initial 0 to 15 minute exposure region to facilitate transverse movement of the heated draft.

Surplus spent gas is accumulated because of the introduction of air and because gases are evolved from the shale during the oil eduction step. These gases may be vented in the hood of the cooling zone so as to utilize the gases fully for cooling the spent shale to a low enough temperature for removal.

The apparatus which is, as indicated above, used is of the conventional traveling grate of either the straight line or circular type. The hoods and windboxes disposed above and below the traveling grate are preferably sealed from exposure to the atmosphere in order to prevent unwanted air from entering the system and causing burning of recoverable oil components. Because of the high heat zone where the oil is actually removed from the rock, it is preferred to operate under a vacuum which aids in extracting a higher percentage of the organics from the oil-bearing mineral.

The resultant product at the end of the traveling grate is an ash-like material, or spent shale, which is largely composed of fixed carbon dispersed through inorganic minerals.

Another system for removing the oil from the shale is illustrated in FIGS. 2 and 6. This process is varied slightly by inserting a preliminary zone or ignition zone ahead of the heating zone. The shale bed is initially ignited by an open flame ignition torch using air and recycled gas for combustion, to rapidly raise the temperature of the bed. For example, in the case of the 48″ layered burden, after approximately 12½ minutes of air draft the bed acquires temperatures in excess of 2000° F. near the topmost portions.

In another embodiment, ignition is facilitated by placing smaller sizes of the shale near the topmost layer. These offer maximum exposure of carbon for purposes of immediate ignition. For example, in the case of a 48″ bed, the blend of minus 2″ plus ¼″ material representing 50% of the materials is layered one foot deep on the bottom portion of the bed. On top of this material a 2′ depth of minus 6″ plus 2″ material is placed as the bed core. On the bed surface minus 2″ plus ¼″ material is oriented or placed about one foot deep as the ignition layer.

The traveling grate with the burden thereon is then exposed to the atmosphere for a short period of travel. This results in burning of a portion of the fixed carbon contained in the shale for supplying heat to elevate the temperature of the bed to oil educting temperature, about 800° F. The burden then enters a second or oil educting zone where the basic process as previously described is repeated.

Another variation of the present invention is illustrated in FIG. 3. As illustrated, a hearth layer of a catalytic material which promotes cracking of the suspended components in the gas streams, is first charged to the traveling grates as a hearth layer. The crushed oil-bearing shale is then layered on this hearth layer. Such cracked components aid in solubilizing the balance of the components derived from the "kerogen" so that the recovery problems are simplified. At normal temperatures, the recovered crude is unpumpable and it is desired to produce a product which can be pumped at normal temperatures.

In the variation of the basic process illustrated in FIG. 4, crushed and graded material ranging in size from about minus 12″ to about plus ¼″, is layered upon the traveling grate to form a 48″ burden or bed. The traveling grate with its burden passes into a first or distilling zone, where the burden is exposed to heat reducing or neutral gases at a temperature of from about 1400° F. to about 1700° F., by passing the gases through the burden, preferably in downdraft fashion. This elevates the temperature of the burden to an oil educting temperature of about 800° F.

The traveling grate passes next into a second or sintering zone, where the burden is exposed to ambient air or hot gaseous products of combustion, which causes combustion of a portion of the carbon and heats the bed to a temperature of about 1600° F. This step is important where the bed depths are greater than about 30 inches, as the temperatures at the bottom of the bed, i.e. that portion of the burden closest to the traveling grate, are rapidly raised to oil educting temperatures. The gaseous medium in this zone preferably passes downwardly through the burden.

As illustrated, the gaseous medium from each zone, e.g. the first and second zones, is passed into a separate cyclone separator, where the entrained oil is separated from the gaseous medium and removed by any suitable means. The traveling grate and the oil-depleted burden passes from the intermediate zone into a final or cooling zone, where the oil-depleted gaseous mediums from the first and intermediate zones, respectively, are each passed through the spent burden at successive points along the traveling grate. The oil-depleted gaseous mediums are passed, preferably, in updraft fashion through the spent shale burden to cool the bed and preheat the gases above the oil-educting temperature, for recycling through a fresh oil-bearing burden in the first zone.

As previously indicated, the recycled gases may be mixed with air in the first zone which ignites combustible constituents therein and raises the temperature of the gases to from about 1400° F. to about 1700° F. The spent burden is removed from the traveling grate by any suitable means.

Alternatively, since it is sometimes difficult to stabilize a flame in the low temperature gases exiting from the burden in the cooling zone, air may be supplied as jet or series of jets impinging on the surface of the hot bed of fixed carbon-containing shale in the cooling zone. The air jet will ignite the fixed carbon in the shale which will enable continuous ignition of the recycled gases to elevate the temperature to about 1500° F.

The gaseous medium of the first and intermediate zones is passed into the single cyclone separator where the oil is separated from the gaseous medium and removed as in the basic process. The oil-depleted gases are passed through the spent burden in the usual fashion as also indicated in the basic process. However, the gaseous medium of the first zone contains higher quality gases, e.g. having in excess of 20% combustible matter by volume, than the gaseous medium of the intermediate zone. The gases are preferably kept separate and separately vented. As seen in FIG. 4, a portion of the oil-depleted gas from the first zone is vented adjacent the separate vent for the oil-depleted gas from the intermediate zone. Thus, the higher and lower quality gases are separately removed as by-products.

Viscosity control of crude shale oil

Crude shale oil recovered from the Colorado oil shales, has unusual properties when contrasted with normal crude oils. Ordinarily, crude shale oil is made from the thermal decomposition of "kerogen," the organic constituent in oil shale. "Kerogen" is partially decomposed at about 800° F. to about 900° F. in the above described process and the evolved oil vapors are immediately condensed and recovered as crude shale oil. The following are characteristics of a typical crude shale oil.

| | |
|---|---|
| Gravity, ° API at 60° F. | 21 |
| Pour point, ° F. | +90 |
| Viscosity, SSU at 122° F. | 175 |
| Sulfur, percent by weight | 0.7 |
| Nitrogen, percent by weight | 1.8 |
| Coke yield, percent weight of total feed (typical) | 10 |

The pour point is of primary importance in the shale oil industry because shale oil should be readily transported by pipe line to refining locations. The high pour point of approximately 90° F. for crude shale oil is attributed to the presence of large wax-like molecules as a constituent of the shale oil which solidify at ordinary temperatures and cause the oil to gell. Through well-known mechanisms such as thermal cracking processes, the wax-like molecule can be broken into a lighter hydrocarbon fractions and the pour point of the oil can be lowered. For example, if crude shale oil is coked or heated to approximately 900° F. for approximately 30 seconds, the heavy molecules are cracked into the lighter fractions and the pour point of the crude is lowered from about 90° F. to about 50° F. so that the oil can be pumped at normal ambient temperatures. Several methods for viscosity breaking or reduction of crude oil pour point on a traveling grate are illustrated in FIGS. 7–9.

Figure 8:
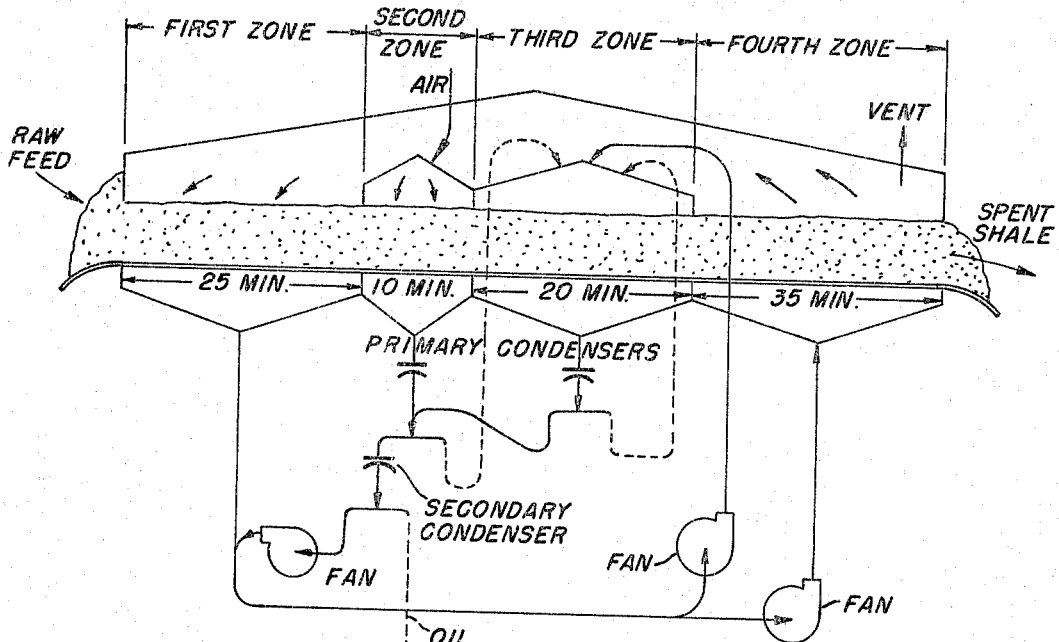
FIG. 8 is a diagrammatic illustration of an apparatus outfitted for performing another modification in which the separated oil is returned for thermal treatment to reduce viscosity.

Referring more particularly to FIG. 7, there is shown a modification of the traveling grate apparatus with a pyrolytic treating zone. Graded oil-bearing material is similarly layered upon the traveling grate to form a bed or burden. The traveling grate with the burden is then moved into a first or ignition zone where hot recycle gases ranging in temperatures from about 1000° F. to about 1500° F. are passed through the bed, preferably, in downdraft fashion. The moving bed is then passed into a second or air sintering zone where the topmost layers of shale are heated to approximately 2000° F. by a draft of air or hot gaseous products of combustion which causes combustion of residual fixed carbon in the oil-bearing material.

The moving burden is then passed into a third zone where recycled crude oil is cracked under substantially non-oxidizing conditions to form lighter ends useful as derivative solvents for viscosity control. The draft from the initial two zones is similarly an oil-like mist or vapor which is carried to a similar cyclone separator which separates the oil from the gases. The demisted draft is then blown to a fourth or cooling zone for cooling the bed and recuperation.

The separated oil is pumped to the viscosity control zone, where it is sprayed on the hot moving bed. Under these conditions, the waxy ends are cracked and pass into a condenser which provides a liquid condensate ranging in temperature from about 600° F. to about 800° F. This condensate can be directed as a liquid recycle to the cracking zone, or it can be directed to the stream of finished lowered pour point oil to the extent required. The vapors from the primary condenser are further cooled to approximately 100° F. in a second condenser for recovering the remaining lighter end hydrocarbons. The 600° F. and 100° F. condensates are mixed to form crude shale oil having a reduced pour point.

A fan is shown in this line for directing the vapor back through the hot bed in the cracking zone. A portion of this stream is fed into the main recycle line of gases for passing through the spent burden in the cooling zone. These gases from the cracking operation and the gases from the retorting zone comprise combustibles for venting. The other constituents of the vented gas comes from the gaseous products that enter the system as air for sintering and combustion of the recycled gases.

Thus, the shale serves both as a catalyst and a heating medium for cracking at least a portion of the crude oil which is trickled upon the bed as it passes through the cracking zone.

The burden is then passed into the cooling zone, where the previously mentioned gases are recycled, preferably, in updraft fashion through the burden. These recycled gases, as in the basic process, are returned to the ignition zone. As previously indicated, the graded oil-bearing material is layered upon the traveling grate, i.e. the coarser material being farthest from the traveling grate. As the bed emerges from the sintering zone and prior to the cracking zone, the temperature of the top ⅓ portion of the bed normally exceeds about 1800° F. The hotter particles having temperatures of about 2000° F., immediately heat the bed surface. The bottom temperatures of the bed follow a gradient ranging from about 1800° F. to about 900° F.

As the warmed high pour point oil is poured onto the incandescent bed surface, it vaporizes and/or trickles through the voids in the bed onto the lower layers where in the course of traversing the bed it becomes subjected to vaporization and further cracking. A product of cracking that ordinarily causes severe problems in retorting, is a formed spongy coke-by-product. Because the coarser products are oriented where the most severe cracking takes place, the resulting spongy coke does not interfere with draft and liquid segregation, as the relatively large voids do not become clogged. Also, the liquid oil poured in this manner tends to materially assist cooling of the solids. The by-product gases from the cracking operation contribute heat values despite heat lost through the cooling operation. Thus, the system is thermally stable and self-sufficient.

The reheated gases from the cooling zone are then recycled back to the first zone where they are passed through fresh oil-laden burden. As in the other systems, air may be added to the recycled gases to cause ignition of combustible constituents and raise the gas temperature to about 1500° F.

The process illustrated in FIG. 8 has some features similar to the previously described process, i.e. retorting by combustion of gas in the recirculatory system, and cracking in a separate zone by pouring liquid oil over the preheated material. This system provides a method of preheating the burden prior to retorting. This refinement of the basic process is applicable to many of the embodiments described herein. The traveling grate with burden is moved into the first or preheating zone where the shale is heated up near, but not exceeding, the point of oil eduction, e.g. about 700° F. This preheated material is available for immediate removal of oil when it is heated approximately 100° F. higher. Using this technique, a confined retorting or second zone is made possible, and enables oil vapors to be accumulated in a very high concentration.

The traveling grate with the burden is moved into the second zone where hot gases ranging in temperatures from about 1000° F. to about 1500° F. are passed through the burden, preferably, in downdraft fashion. The burden is then moved into a third or cracking zone where liquid oil is poured over the hot burden. As seen from the illustration, a portion of the recycled gas from zone one is fed into the cracking zone.

The oil-containing vapors from the retorting and cracking zones are each passed through condensers. Separated liquid oil from each condenser is then recirculated to the cracking zone. The vapors from the primary condensers are then passed through a secondary condenser and the cracked liquid oil removed therefrom. The remaining gases from the secondary condenser are then recycled with the recycle gases from the first zone to the fourth or cooling zone where they are similarly passed through the spent burden for return to the preheating and retorting zones. In the retorting zone, air is added to raise the temperature of the recycle gases to about 1500° F.

The variation of the basic process illustrated in FIG. 9, is similar to that of FIG. 8. A first or condensing zone prior to the preheating zone is used in place of the secondary condenser. This zone enables alternate condensing through use of the crushed oil-bearing material as the cooling medium. The vapors obtained from the primary condensers are passed through the cool burden on the traveling grate in the first or condensing zone. The vapors are then passed into a cyclone separator where the oil is separated from the gaseous medium. As in the basic process, the oil is recovered by any suitable means. The separated gaseous medium from the first zone and a portion of the gaseous medium from a second zone are similarly recycled to a fifth or cooling zone where the gases are passed upwardly through the spent burden to cool the burden and reheat the gases for return to the second and third zones as previously mentioned. Through use of this condenser the bed becomes mildly heated.

The burden is then moved to the second or preheating zone where the bed is preheated to approximately 700° F. Though downdraft is illustrated entirely for this preheating zone, there could be a series arrangement using both updraft and downdraft for preheating. In a third or retorting zone, the normal methods of retorting described above can be applied including such steps as combustion of some of the recirculatory gases to raise the temperature to approximately 1500° F. Another method of retorting utilizes air sintering in the zone with combustion of fixed carbon in the shale. In the fourth zone, cracking is performed in a manner similar to that of the previously described process. However, here only the 600° F. condensate of heavy hydrocarbons is subjected to cracking, thus contributing to system yield. The spent burden is similarly cooled in a fifth zone. Treatment of 200 pounds of shale in the manner described in FIGS. 7–9, based on a 4′ bed, would, for example, provide 20 pounds of 90° F. pour point crude oil, which after a cracking treatment would convert into 17 pounds of crude oil with a pour point of 60° F.

As previously indicated, there is an accumulation of surplus vent gas which is removed. Such gases are diluted in fuel content and contain uncondensed vapors of light hydrocarbon fractions. In order to recover such vapor fractions, it is necessary to use equipment such as compressors, refrigerants and extraction apparatus. The size and expense of this equipment is directly related to the volume of the vent gas. Therefore, it is important that the volume of such gases be minimized. Such a system is illustrated in FIG. 10. The fresh graded shale is similarly charged to a traveling grate, i.e., the coarser material being farthest from the grates.

The traveling grate with burden is then moved into a first or preheating zone, where the burden is heated up near, but not exceeding the point of oil eduction, e.g., approximately 500° F. at the top of the bed. The preheated burden is then moved into a second or retorting zone where gases ranging in temperatures from about 1400° F. to about 1700° F. are passed, preferably, in downdraft fashion through the preheated burden to raise the burden to oil educting temperature of about 800° F. as in the basic process.

The spent burden is then moved into a third zone, where it is exposed to a draft of air or hot gaseous products of combustion which causes burning of the fixed carbon and raises the temperature of the spent burden to about 1650° F. The gases from the third zone are returned to the preheating zone where they are passed through a fresh burden. The traveling grate with heated spent burden is then moved into a fourth or cooling-recycle zone. As in the basic process, the oil containing vapors from the retorting zone are sent through a cyclone separator where the oil is separated from the gaseous medium. The separated gaseous medium is returned to the fourth zone, where it is passed through the heated spent burden to cool the burden and to raise the temperature of the gaseous medium to from about 1400° F. to about 1700° F. The reheated gaseous medium is returned to the retorting zone for passage through a fresh preheated burden. As in the basic process, air may be added to the returned gases. However, reheating the gaseous medium in the above-mentioned manner eliminates or substantially reduces the amount of air introduced into the retorting zone to cause combustion of the gases to raise their temperatures to from about 1400° F. to about 1700° F.

The traveling grate with the cooled burden is then moved into a fifth or post-cooling zone where the spent burden is still further cooled by passing the cooled gases received from the preheating zone through the cooled spent burden. The cooled gases from the fifth zone are removed and discarded. Although this method for cooling the spent shale in the post-cooling zone is preferred, the spent shale could be cooled by coaction with any suitable coolant after it leaves the fourth zone. The separated gaseous medium from the retorting zone contains a relatively small amount of vent gas which is separately vented prior to passing the separated gaseous medium through the heated spent burden in the fourth zone. The amount of vent gas is greatly reduced, e.g., from about 30–40% by weight of the shale input to about 3–7% thereby reducing the cost of treating such gases. A cracking zone as previously described may be provided in the fourth zone or prior thereto.

Thus there has been provided a novel process for recovering oil from oil bearing materials. The traveling grate process herein disclosed is far more economical to operate, and enables handling much greater amounts of oil-bearing material than handled by other known methods for recovering such mineral oil.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A process for the recovery of oil from oil-bearing material comprising the steps of:
   (a) charging the oil-bearing material to a traveling grate to form a burden;
   (b) moving the traveling grate with the burden, into a first zone;
   (c) passing hot gases through the burden in the first zone, to elevate the temperature of the burden to an oil educting temperature of at least about 800° F., and simultaneously condensing educted oil by contact of the gases wiht a portion of the burden which is at a temperature below the eduction temperature whereby the oil becomes suspended in and partially vaporized in the hot gaseous medium;
   (d) separating and recovering oil from the gaseous medium;
   (e) moving the traveling grate with the spent burden thereon, into a second zone;
   (f) recycling the oil-depleted gaseous medium through the burden, in the second zone, to elevate the temperature of the gases for return to the first zone; and
   (g) returning the gases to the first zone.

2. A process for the recovery of oil from oil-bearing shale comprising the steps of:
   (a) crushing the shale;
   (b) charging the crushed shale to a traveling grate to form a burden thereon;
   (c) moving the traveling grate with the burden, into a first zone;
   (d) passing hot gases through the burden in the first zone, to elevate the temperature of the burden to an oil educting temperature of at least about 800° F., and simultaneously condensing educted oil by contact of the gases with a portion of the burden which is at a temperature below the eduction temperature whereby the oil becomes suspended in and partially vaporized in the hot gaseous medium;
   (e) separating and recovering oil from the gaseous medium;
   (f) moving the traveling grate with the spent burden thereon, into a second zone;
   (g) recycling the oil-depleted gaseous medium through the burden, in the second zone, to elevate the temperature of the gases for return to the first zone; and
   (h) returning the gases to the first zone.

3. The process of claim 2, wherein the size of the pieces of shale, after crushing, does not exceed about 18″ in width in any one plane.

4. The process of claim 3, wherein the shale is graded after crushing, and is then charged to the traveling grate in superimposed layers of particles having different and decreasing average particle sizes in successive layers in the direction of the flow of gases through the burden in the oil educting zone.

5. The process of claim 2, wherein the hot gases in the first zone are passed downward through the burden.

6. The process of claim 5, wherein the recycled gaseous medium, in the second zone, is passed upward through the spent burden.

7. The process of claim 2, wherein the hot gases passed through the burden in the first zone range in temperature from about 1000° F. to about 1500° F.

8. The process of claim 2, wherein air is added to the returned gases in the first zone, to cause ignition thereof, whereby the temperature thereof is raised to from about 1000° F. to about 1500° F.

9. The process of claim 2, wherein the burden on the traveling grate, is exposed to ambient air intermediate the first and second zones.

10. A process for the recovery of oil from oil bearing shale comprising the steps of:
    (a) crushing the shale to sizes not exceeding about 18″ in width in any one plane;
    (b) grading the shale according to size;
    (c) charging the graded shale in superimposed layers of particles having different and decreasing average particle sizes in successive layers in the direction of the flow of gases through the burden in the oil educting zone to a traveling grate to form a burden thereon;
    (d) moving the traveling grate with the burden into a first zone;
    (e) passing hot gases ranging in temperatures from about 1000° F. to about 1500° F. through the burden in the first zone, to elevate the temperature of the burden to an oil educting temperature of at least 800° F., and simultaneously condensing educted oil by contact of the gases with a portion of the burden which is at a temperature below the eduction temperature whereby the oil becomes suspended in and partially vaporized in the hot gaseous medium;
    (f) separating and recovering oil from the gaseous medium;
    (g) moving the traveling grate with the spent burden thereon, into a second zone;
    (h) recycling the separated gaseous medium through the burden, in the second zone, to preheat the gases toward an oil educting temperature for return to the first zone;
    (i) returning the gases toward the first zone;
    (j) heating the returned gases to a temperature ranging from about 1000° F. to about 1500° F.; and
    (k) removing the spent shale from the traveling grate.

11. The process of claim 10, wherein air is admixed with the returned gases adjacent the first zone, to cause ignition thereof, whereby the temperature thereof is raised to from about 1000° F. to about 1500° F., and wherein air applied as jet streams impinged on the surface of the spent oil-depleted shale in the second zone for igniting fixed carbon in said shale and aiding in igniting said returned gases.

12. The process of claim 10, wherein air is admixed with the returned gases adjacent the first zone, to cause ignition thereof, whereby the temperature thereof is raised to from about 1000° F. to about 1500° F., and which includes:
(l) moving the traveling grate with the burden thereon into a zone intermediate the first and second zones;
(m) pouring the separated oil over the hot burden in the intermediate zone to cause cracking of the oil; and
(n) removing the cracked oil from the intermediate zone.

13. The process of claim 10, wherein air is admixed with the returned gases adjacent the first zone, to cause ignition thereof, whereby the temperautre thereof is raised to from about 1000° F. to about 1500° F., and wherein the shale charged to the traveling grate is layered thereupon in grades ranging from fines having a particle size of from about ¼″ to about 1″ adjacent the grate, to succeeding layers of progressively coarser material.

14. The process of claim 13, wherein a hearth layer of catalytic material is placed on the traveling grate before the burden is charged thereto, the catalytic material promoting cracking of the suspended components in the gas streams to aid in solubilizing said components.

15. The process of claim 13, wherein the shale charged to the traveling grate, before moving to the first zone, is ignited by an open flame ignition torch using air and recycled gas to raise the temperature of the burden in excess of about 2000° F.

16. A process for the recovery of oil from oil-bearing material comprising the steps of:
(a) charging the oil-bearing material to a traveling grate to form a burden thereon;
(b) moving the traveling grate with the burden thereon, into the first zone;
(c) passing hot gases ranging in temperatures from about 1400° F. to about 1700° F. through the burden in the first zone, to elevate the temperature of at least a portion of the burden to an oil educting temperature of at least about 800° F., and simultaneously condensing educted oil by contact of the gases with a portion of the burden which is at a temperature below the eduction temperature whereby the oil becomes suspended in and partially vaporized in the hot gaseous medium;
(d) moving the traveling grate with the burden thereon, into an intermediate zone;
(e) exposing the burden to a draft of ambient air passed therethrough in the intermediate zone, to raise the temperature of the burden farthest from the traveling grate to approximately 2000° F.;
(f) separating and recovering oil from the gaseous medium collected from the first and intermediate zones;
(g) moving the traveling grate with the spent burden thereon, into a second zone;
(h) recycling the oil depleted gaseous medium through the spent burden in the second zone, to elevate the temperature of the gases for return to the first zone; and
(i) returning the gases to the first zone.

17. The process of claim 16, wherein air is added to the returned gases in the first zone, to raise the temperature thereof to from about 1400° F. to about 1700° F., for passing through a new burden.

18. The process of claim 16, wherein the hot gases are passed downward through the burden in the first and intermediate zones.

19. The process of claim 18, wherein the oil depleted gaseous medium is passed upward through the spent burden in the second zone.

20. A process for the recovery of oil from oil-bearing material comprising the steps of:
(a) charging the oil-bearing material to a traveling grate to form a burden thereon;
(b) moving the traveling grate with the burden thereon, into a first zone;
(c) passing hot gases ranging in temperatures from about 1400° F. to about 1700° F., through the burden in the first zone, to elevate the temperature of at least a portion of the burden to an oil educting temperature of at least about 800° F., and simultaneously condensing educted oil by contact of the gases with a portion of the burden which is at a temperature below the eduction temperature whereby the oil becomes suspended in and partially vaporized in the hot gaseous medium;
(d) moving the traveling grate with the burden thereon, into an intermediate zone;
(e) exposing the burden to a draft of ambient air passed therethrough in the intermediate zone, to raise the temperature of the burden farthest from the traveling grate to approximately 2000° F.;
(f) separating and recovering oil from the gaseous medium collected from the first zone;
(g) separating and recovering oil from the gaseous medium collected from the first and intermediate zones;
(h) moving the traveling grate with the spent burden thereon, into a second zone;
(i) separating and recovering oil from the gaseous medium collected from the intermediate zone;
(j) returning the gases toward the first zone;
(k) recycling the oil depleted gaseous medium from the first and intermediate zones, through the spent burden in the second zone, to elevate the temperature of the gases for return to the first zone; and
(l) returning the gases to the first zone.

21. The process of claim 20, wherein air is added to the returned gases in the first zone, to raise the temperature thereof to form about 1400° F. to about 1700° F.

22. The process of claim 21, wherein the hot gases are passed downward through the burden in the first zone.

23. The process of claim 22, wherein the hot gases, in the intermediate zone, are drawn downward through the burden on the traveling grate.

24. The process of claim 23, wherein the oil depleted gaseous medium is passed upward through the spent burden in the second zone.

25. A process for recovering oil from oil-bearing material, comprising the steps of:
(a) crushing the material to sizes not exceeding about 18″ in width in any one plane;
(b) grading the material according to size;
(c) charging the graded material to a traveling grate in superimposed layers of particles having different decreasing average particle sizes in successive layers in the direction of the flow of gases through the burden in the oil educting zone to form a burden thereon;
(d) moving the traveling grate with the burden thereon, into a first zone;
(e) passing hot gases ranging in temperature from about 1000° F. to about 1500° F. through the burden in the zone, to elevate the temperature of the burden to an oil educting temperature of at least about 800° F., and simultaneously condensing educted oil by contact of the gases with a portion of the burden which is at a temperature below the eduction temperature whereby the oil becomes suspended in and partially vaporized in the hot gaseous medium;
(f) moving the traveling grate with the burden thereon, into a second zone;

(g) heating the layers of material farthest from the traveling grate, to about 2000° F. by exposing the burden to air, which causes cumbustion of the residual fixed carbon in the decomposed shale oil, whereby the temperature of the burden is raised and oil becomes suspended in/and partially vaporized in the hot gaseous medium;

(h) moving the traveling grate with burden thereon, into a cracking zone;

(i) separating and recovering oil from the gaseous medium of the first and second zones;

(j) pouring the recovered oil over the hot burden in the cracking zone to cause cracking of the oil;

(k) removing the cracked oil in the form of vapor;

(l) moving the traveling grate with spent burden thereon into a third zone;

(m) recycling the separated gaseous medium through the burden, in the third zone, to preheat the gases toward an oil educting temperature for return to the first zone;

(n) returning the gases toward the first zone;

(o) heating the returned gases to temperatures ranging from about 1000° F. to about 1500° F.; and (p) removing the spent shale from the traveling grate.

26. The process of claim 25, wherein the gases, in the first zone, are passed downwardly through the burden.

27. The process of claim 26, wherein the recycled gases, in the second zone, are passed upwardly through the burden.

28. The process of claim 27, wherein air is mixed with the returned gases adjacent the first zone, to cause ignition thereof, whereby the temperature thereof, is raised from about 1000° F. to about 1500° F.

29. The process of claim 28, wherein air is applied as jet streams impinged on the surface of the spent oil-depleted shale in the second zone for igniting fixed carbon in said shale and aiding in igniting said returned gases.

30. The process of claim 29, wherein the shale charged to the traveling grate, is layered thereupon in grades ranging from fines having a particle size of from ¼" to 1" adjacent the grate, to succeeding layers of progressively coarser material.

31. The process of claim 29, which includes:

(q) condensing the cracked oil vapor in a primary condenser causing the heavier fractions to liquefy and the lighter fractions to vaporize;

(r) removing the liquid oil;

(s) further condensing the oil vapor of the lighter fractions in a second condenser; and (t) removing the liquid oil from the second condenser.

32. The process of claim 31, which includes recycling the liquid oil from the primary condenser into the cracking zone.

33. A process for recovering oil from oil-bearing material comprising the steps of:

(a) charging oil-bearing material to a traveling grate to form a burden thereon;

(b) moving the traveling grate with burden into a first zone;

(c) passing hot gases through the burden in the first zone to elevate the temperature of the burden to about oil educting temperature;

(d) moving the traveling grate with preheated burden into a second zone;

(e) passing hot gases ranging in temperatures from about 1400° F. to about 1700° F. through the preheated burden in the second zone, to elevate the temperature of the burden to an oil educting temperature of at least about 800° F., and simultaneously condensing educted oil by contact of the gases with a portion of the burden which is at a temperature below the eduction temperature whereby the oil becomes suspended in and partially vaporized in the hot gaseous medium;

(f) separating and recovering oil from the gaseous medium collected from the second zone;

(g) moving the traveling grate with hot spent burden into a third zone;

(h) passing the oil depleted gaseous medium from the second zone through the hot spent burden in the third zone to elevate the temperature of the gases for recycling to the first and second zones;

(i) recycling a portion of the preheated gases from the third zone to the first zone for passing through a fresh burden; and (j) recycling a portion of the reheated gases from the third zone to the second zone for passing through another preheated burden.

34. A process for recovering oil from oil-bearing material comprising the steps of:

(a) charging oil-bearing material to a traveling grate to form a burden thereon:

(b) moving the traveling grate with burden into a first zone;

(c) passing hot gases through the burden in the first zone to elevate the temperature of the burden to about oil educting temperature;

(d) moving the traveling grate with preheated burden into a second zone;

(e) passing hot gases ranging in temperatures from about 1400° F. to about 1700° F. through the preheated burden in the second zone, to elevate the temperature of the burden to an oil educting temperature of at least about 800° F. and simultaneously condensing educted oil by contact of the gases with a portion of the burden which is at a temperature below the eduction temperature whereby the oil becomes suspended in and partially vaporized in the hot gaseous medium;

(f) separating and recovering oil from the gaseous medium collected from the second zone;

(g) moving the traveling grate with the spent burden into a third zone;

(h) exposing the hot spent burden on the traveling grate in the third zone to a draft of ambient air to raise the temperature of the hot spent burden in excess of oil educting temperature;

(i) recycling the hot gases from the third zone to the first zone for passing through a fresh burden moved therein;

(j) moving the traveling grate with hot spent burden into a fourth zone;

(k) recycling the oil depleted gaseous medium from the second zone through the hot spent burden in the fourth zone, to heat the gases toward an oil educting temperature for return to the second zone; and (l) recycling the heated gases from the fourth zone to the second for passing through a preheated burden moved therein.

35. The process of claim 34, which includes:

(o) moving the traveling grate with cooled spent burden into a fifth zone;

(p) passing cooled gases obtained from the first zone through the cooled burden to further cool the burden;

(q) removing the gases from the fifth zone; and (r) separately removing vent gas from the oil depleted gaseous medium prior to its return to the fourth zone.

36. The process of claim 35, wherein the burden farthest from the grate, is heated to a temperature of about 2100° F. in the third zone.

37. The process of claim 36, wherein the spent burden in the third zone, is exposed to hot gaseous products of combustion to raise its temperature.

(References on following page)

References Cited

UNITED STATES PATENTS

| | | | |
|---|---|---|---|
| 1,317,514 | 9/1919 | McCaskell | 201—32 |
| 1,909,956 | 5/1933 | Hereng | 201—29 |
| 2,029,762 | 2/1936 | Derby et al. | 201—32 |
| 2,269,025 | 1/1942 | Johansson | 201—32 |
| 2,380,930 | 8/1945 | Anderson et al. | 201—32 |
| 2,560,767 | 7/1951 | Huff | 201—29 |
| 2,573,906 | 10/1951 | Huff | 208—11 |
| 2,661,325 | 12/1953 | Savage | 202—262 |
| 3,227,627 | 1/1966 | Asquini | 201—32 |
| 3,228,869 | 1/1966 | Irish | 208—11 |

FOREIGN PATENTS

| | | |
|---|---|---|
| 278,694 | 11/1928 | Great Britain. |
| 278,740 | 11/1928 | Great Britain. |

DANIEL E. WYMAN, *Primary Examiner.*

P. E. KONOPKA, *Assistant Examiner.*